United States Patent
Scofet et al.

(10) Patent No.: US 7,711,220 B2
(45) Date of Patent: May 4, 2010

(54) MODE SELECTIVE FIBER STUB, A TRANSMITTER OPTICAL SUBASSEMBLY THAT INCORPORATES THE STUB AND METHODS FOR MAKING THE MODE SELECTIVE FIBER STUB

(75) Inventors: Marco Scofet, Rivarolo Canavese (IT); Cristiana Contardi, Moncalieri (IT); Luigi Tallone, Paesana (IT)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 104 days.

(21) Appl. No.: 12/030,280

(22) Filed: Feb. 13, 2008

(65) Prior Publication Data

US 2009/0202201 A1    Aug. 13, 2009

(51) Int. Cl.
G02B 6/26    (2006.01)
G02B 6/42    (2006.01)

(52) U.S. Cl. .......................................... 385/29; 385/27
(58) Field of Classification Search .............. 385/27–29
See application file for complete search history.

(56) References Cited

U.S. PATENT DOCUMENTS

| | | | |
|---|---|---|---|
| 5,581,649 A * | 12/1996 | Paquette et al. ............. | 385/140 |
| 6,044,188 A * | 3/2000 | Kropp ........................... | 385/33 |
| 6,580,543 B1 * | 6/2003 | Fan et al. ..................... | 398/200 |
| 7,146,073 B2 * | 12/2006 | Wan ............................. | 385/29 |
| 7,349,596 B2 * | 3/2008 | Anderegg et al. ............. | 385/29 |
| 2005/0265653 A1 * | 12/2005 | Cai et al. ...................... | 385/28 |
| 2006/0171631 A1 * | 8/2006 | Deng et al. ................... | 385/28 |

\* cited by examiner

*Primary Examiner*—Uyen-Chau N Le
*Assistant Examiner*—Rhonda S Peace

(57) ABSTRACT

A fiber stub assembly is provided that has a cladding layer that is reduced in diameter near the end of the stub into which light is launched from a light source. The portion of the stub having the cladding layer with the reduced diameter is surrounded by a light-absorbing material that is in contact with the inner surface of the ferule and with the outer surface of the cladding layer. The light-absorbing material and the outer surface of the cladding layer have indices of refraction that are matched, or very close to one another, such that any modes of light that are propagating in the cladding layer that impinge on the interface propagate into the light-absorbing material and are absorbed thereby. The reduced diameter of the cladding layer and the surrounding light-absorbing material form a pin hole opening through which light is received. The pin hole opening makes it possible to use a simple ball lens to focus light from the light source into the end of the fiber stub to thereby reduce the number of modes that are dispersed into the cladding layer.

16 Claims, 4 Drawing Sheets

MODE SELECTIVE FIBER STUB, A TRANSMITTER OPTICAL SUBASSEMBLY THAT INCORPORATES THE STUB AND METHODS FOR MAKING THE MODE SELECTIVE FIBER STUB

TECHNICAL FIELD OF THE INVENTION

The invention relates to optical fibers used in optical communications networks. More particularly, the invention relates to a fiber stub that causes light input thereto from an optical source to be controlled such that a selected mode or modes are allowed to propagate beyond the fiber stub and other modes are attenuated.

BACKGROUND OF THE INVENTION

FIG. 1 illustrates a plan view of the optical components of a typical Transmitter Optical Subassembly (TOSA) 2. In the typical TOSA, an aspheric lens 3 receives light generated by a laser diode 4 and focuses the light into the end 6 of an optical fiber stub 5. The optical fiber stub 5 is a short length of single-mode (SM) fiber that is secured within a ferule (not shown) and which has been polished on the end 6 by a polishing process.

FIG. 2 illustrates a plan view of the fiber stub 5 shown in FIG. 1 having an end 7 that is interfaced with an end 14 of a multi-mode (MM) fiber 11 of a MM patch cord (not shown). The ends 7 and 14 of the stub 5 and MM fiber 11, respectively, are typically interfaced to each other by a simplex connector (not shown). The SM fiber stub 5 has a cylindrically-shaped core 8 and a cladding layer 9 that surrounds the core 8. Likewise, the MM fiber 11 has a cylindrically-shaped core 12 and a cladding layer 13 that surrounds the core 12. It can be seen that the diameter of the core 12 of the MM fiber 11 is significantly greater than that of the core 8 of the SM fiber stub 5. Light propagating through the core 8 of the SM fiber stub 5 is coupled into the end 14 of the MM fiber 11 and propagates along the core 12 of the MM fiber 11, which is an intended result. In addition, it can also be seen in FIG. 2 that light propagating in the cladding layer 9 of the stub 5 also is coupled into the core 12 of the MM fiber 11, which is an unintended and undesirable result.

The light propagating in the cladding layer 9 of the fiber stub 5 is caused by improper optical coupling conditions (e.g., transversal misalignment, de-focalization, etc.) or aberrations, which result in modal dispersion of the light generated by the laser diode 4 and coupled into the end 6 of the fiber stub 5. This modal dispersion in the stub 5 leads to multiple modes being coupled from the end 7 of the stub 5 into the end 14 of the MM fiber 11, and thus into the core 12 of the MM fiber 11. Modal dispersion is undesirable, and different approaches are used to prevent or lessen it. The use of the aspheric lens 3 helps confine the light launched from the laser diode 4 to the core 8 of the stub 5 such that the light excites the central, or fundamental, mode of the SM fiber stub 5. Generally, a perfect peak alignment is needed to prevent or inhibit transversal misplacement and de-focalization of the light launched from the laser diode 4. An alternative to using an aspheric lens for this purpose is to use a ball lens with a pin hole to confine the light such that it is only launched into the core 8 of the stub 5.

The lens of a TOSA of the type shown in FIG. 1 is generally the second-most expensive component of the TOSA. The laser diode typically is the most expensive component of the TOSA. Aspheric lenses and ball lenses with pin holes are expensive compared to a simple ball lens. For example, a simple ball lens currently costs about $1.00, whereas an aspheric lens currently costs about $4.00 to $5.00. Thus, from a cost standpoint, it would be desirable to be able to use a simple ball lens in a TOSA. A simple ball lens, however, is generally unsuitable for this purpose due to the fact that it produces spherical aberrations that excite the cladding modes of the SM fiber stub 5. Consequently, the only suitable alternative to using the simple ball lens is to use one of the aforementioned more expensive lens configurations.

Accordingly, a need exists for a solution to the problem of modal dispersion that does not require the use of an expensive aspheric lens or a ball lens and pin-hole configuration.

SUMMARY OF THE INVENTION

In accordance with the invention, an optical fiber stub assembly, a TOSA comprising the fiber stub assembly, and a method for making the fiber stub assembly. The fiber stub assembly comprises an optical fiber stub, a ferule and a light-absorbing material. The stub has a core and a cladding layer, a proximal portion and a distal portion. The proximal portion has a proximal end and the distal portion has a distal end. The cladding layer has an inner surface that is in contact with an outer surface of the core. The cladding layer has an inner diameter corresponding to the inner surface of the cladding layer. The cladding layer has a first outer diameter corresponding to the outer surface of the cladding layer in the proximal portion of the fiber stub. The cladding layer has a second outer diameter corresponding to the outer surface of the cladding layer in the distal portion of the stub. The first outer diameter is smaller than the second outer diameter.

The ferule has a cavity formed therein that surrounds the proximal portion of the fiber stub. The light-absorbing material surrounds at least the outer surface of the cladding layer in the proximal portion of the fiber stub. The light-absorbing material has a refractive index that is equal to, or at least substantially equal to, the refractive index of the outer surface of the cladding layer. The light-absorbing material is absorptive to light of at least one particular wavelength or wavelength range such that at least one mode of light of the particular wavelength or wavelength range that is propagating in the cladding layer propagates into the light-absorbing material and is absorbed thereby.

These and other features and advantages of the invention will become apparent from the following description, drawings and claims.

DETAILED DESCRIPTION OF AN ILLUSTRATIVE EMBODIMENT

In accordance with various embodiments that will be described herein, a fiber stub assembly is provided that has a cladding layer that is reduced in diameter near the end of the stub into which light is launched from a light source. The portion of the stub having the cladding layer with the reduced diameter is surrounded by a light-absorbing material that is in contact with the inner surface of the ferule and with the outer surface of the cladding layer. The light-absorbing material and the outer surface of the cladding layer have indices of refraction that are matched, or very close to one another, such that any modes of light that are propagating in the cladding layer that impinge on the interface propagate into the light-absorbing material and are absorbed thereby. The reduced diameter of the cladding layer and the surrounding light-absorbing material form a pin hole opening through which light is received. The pin hole opening makes it possible to use a simple ball lens to focus light from the light source into the end of the fiber stub to thereby reduce the number of modes that are dispersed into the cladding layer.

Figure 3:
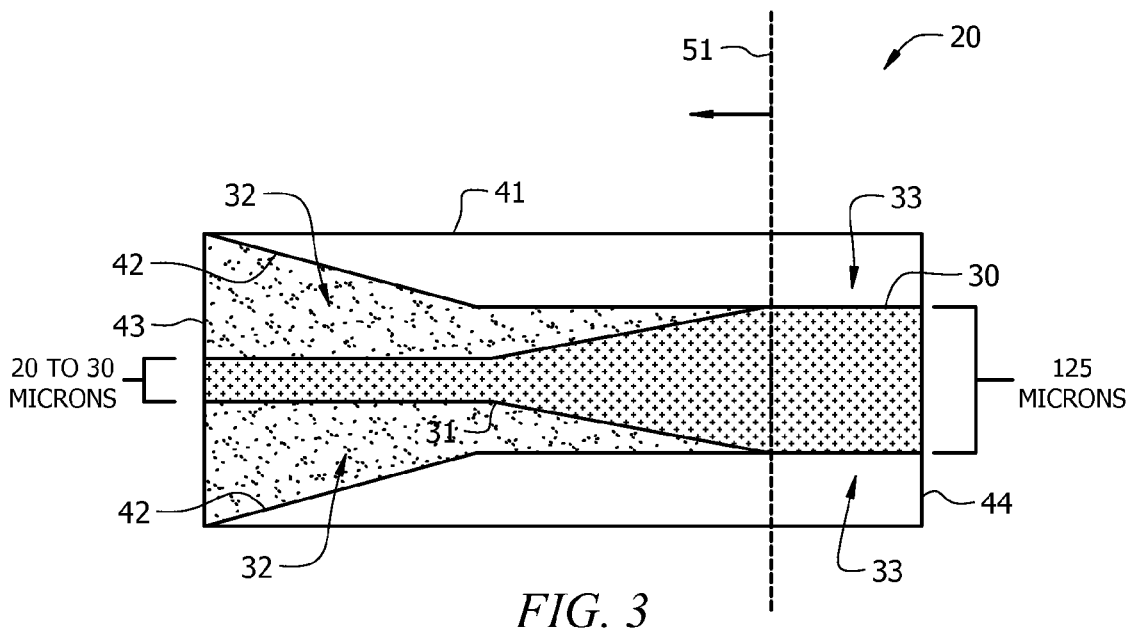
FIG. 3 illustrates a plan view of a SM fiber stub assembly in accordance with an embodiment of the invention comprising a SM fiber stub and a ferule that surrounds the fiber stub, wherein a portion of the cladding layer of the fiber stub has been etched to reduce the diameter thereof.

FIG. 3 illustrates a plan view of a SM fiber stub assembly 20 comprising a SM fiber stub 30 and a ferule 41 that surrounds the fiber stub 30. The ferule 41 has a shaped, or chamfered, inner portion comprising an inner surface 42 that is tapered, or cone-shaped, starting at its proximal end 43 and extending a distance into the ferule 41 in the direction toward the distal end 44 of the ferule 41. The ferule 41 may be a standard, or typical, ferule of the type having a chamfered inner surface for facilitating the process of inserting and aligning a fiber within the ferule 41. Therefore, the ferule 41 does not need to be custom made. It is not necessary for the shape of the inner portion of the ferule 41 to be chamfered, or cone-shaped, but the ferule 41 needs to have an inner surface that is shaped in some manner to provide a cavity that surrounds the fiber stub 30.

After the fiber stub 30 has been inserted into the ferule 41 and aligned with the central axis of the ferule 41, a portion 32 of the cladding layer 31 of the stub 30 is etched away from approximately the middle of the assembly 20, as designated by the dashed line 51, to the proximal end 43 of the ferule 41. This may be accomplished by placing the portion of the ferule containing the portion 32 in an acid bath, such as a fluoridic acid bath solution, for example, for a particular length of time. The etching solution acts along all exposed surfaces of the fiber stub 30 within the ferule 41 to uniformly etch the fiber stub 30 until the outer diameter of the cladding layer 31 is reduced from a diameter of approximately 125 micrometers (μm) to a selected diameter of, for example, 20 to 30 μm. Thus, the result of the etching process is that the cladding layer 31 of the fiber stub 30 is left with an etched proximal portion 32 (left side of dashed line 51 in FIG. 3) and an unetched distal portion 33 (right side of dashed line 51 in FIG. 3). In addition, the etching process can be performed simultaneously on batches of the assemblies 20, which means that only a single additional step needs to be added to the ferule manufacturing process.

Figure 4:
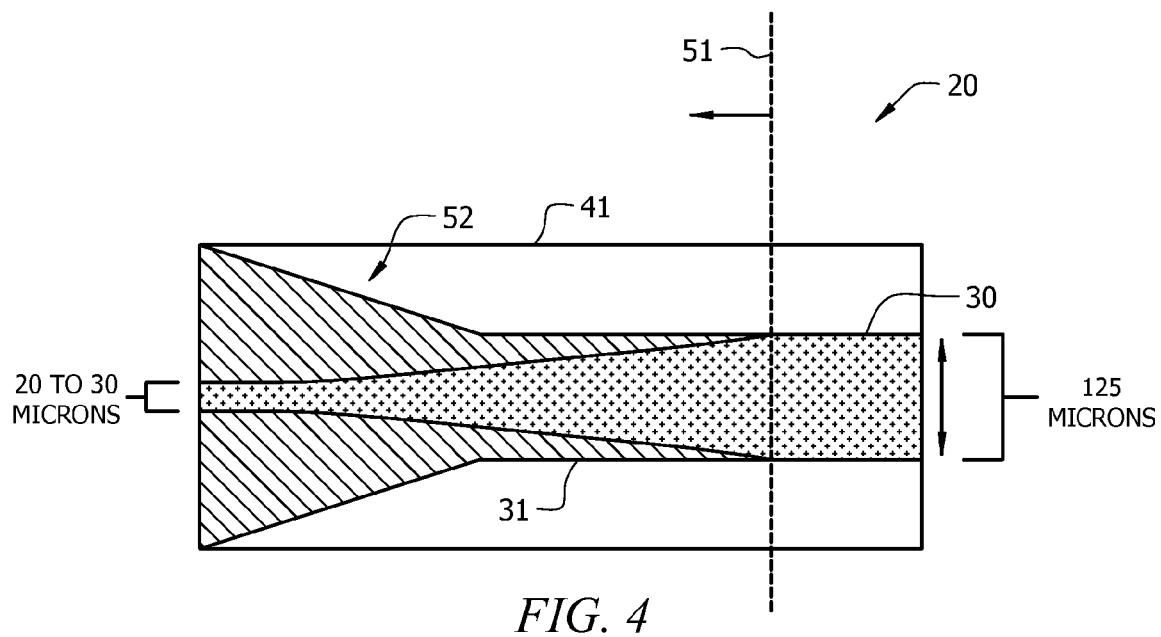
FIG. 4 illustrates a plan view of the SM fiber stub assembly shown in FIG. 3 after the ferule has been filled with an epoxy that is absorptive to light of the wavelengths of operation.

FIG. 4 illustrates a plan view of the SM fiber stub assembly 20 shown in FIG. 3 after the ferule 41 has been filled with an epoxy 52. After the etching process has been performed to etch away part of the cladding layer 31, the ferule 41 is filled with a "light-absorbing" material, which may be, for example, a "black" epoxy 52. The epoxy 52 is referred to herein as being "black" or "light-absorbing" due to the fact that the epoxy 52 is absorptive to light in the 1300 and 1550 nanometer (nm) wavelengths typically used for communicating signals over optical fibers. This wavelength range that the epoxy is absorptive to typically is a subset of the infrared (IR) wavelength range (800 nm to 3000 nm) and will typically include IR wavelengths that are used in the telecommunications industry (e.g., 800 nm to 1600 nm). The epoxy 52 has a refractive index that substantially matches the refractive index of the cladding layer 31 of the fiber stub 30 so that light propagating in the cladding layer 31 is not internally reflected at the interface of the cladding layer 31 and the epoxy 52, but rather, passes into the epoxy 52 and is absorbed thereby. This prevents light of undesired modes (i.e., modes other than the fundamental mode) that is propagating in the cladding layer 31 of the fiber stub 30 from being coupled into the core (not shown) of the MM fiber (not shown) of the MM patch cable, as will now be described with reference to FIG. 5.

Figure 5:
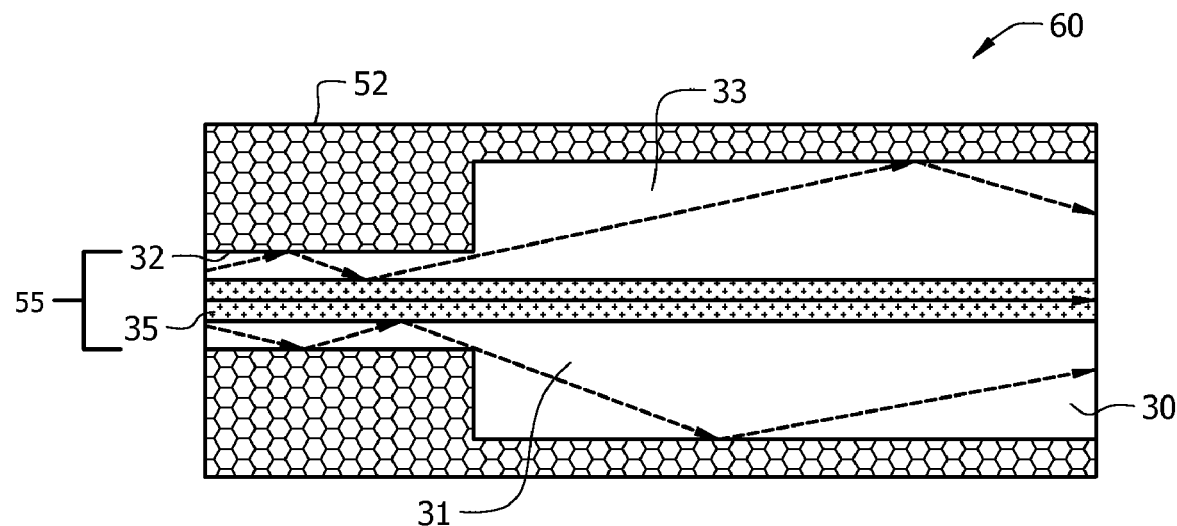
FIG. 5 illustrates a cross-section of the assembly shown in FIG. 4 with the ferule removed so that the interface between the epoxy and the cladding layer of the fiber stub may be easily seen.

FIG. 5 illustrates a cross-section 60 of the assembly 20 shown in FIG. 4 with the ferule 41 removed so that the interface between the epoxy 52 and the cladding layer 31 of the fiber stub 30 may be easily seen. In addition to the absorptive function performed by the black epoxy 52 described above, the epoxy 52 also performs a filtering function, as will now be described. By providing the cladding layer 31 with a reduced diameter in the etched portion 32 of the cladding layer 31, and by surrounding the etched portion 32 with the black epoxy 52, the size of the opening 55 in the stub 30 through which light from the laser diode (not shown) can be launched into the stub 30 is reduced. The size of the opening 55 is reduced such that it acts as a very effective pin hole. The opening 55 has a diameter that is typically around 20 to 30 microns in size. The reduced size of the opening 55 helps to lessen modal dispersion and thereby reduce the number of modes of light that are propagating in the cladding layer 31. Light launched from the laser diode that impinges on an area of the stub 30 around the opening 55 will be reflected by or absorbed by the epoxy 52 surrounding the opening. In addition, because the etched and unetched portions 32 and 33, respectively, of the stub 30 are surrounded by the black epoxy 52, most if not all of the modes of light that are propagating in the cladding layer 31 will pass into the epoxy 52 and be absorbed by it. The overall result is that less, if any, modes of light other than the fundamental mode propagating in the core 35 will by coupled into the core (not shown) of the MM fiber (not shown) of the MM patch cable (not shown).

Figure 1:
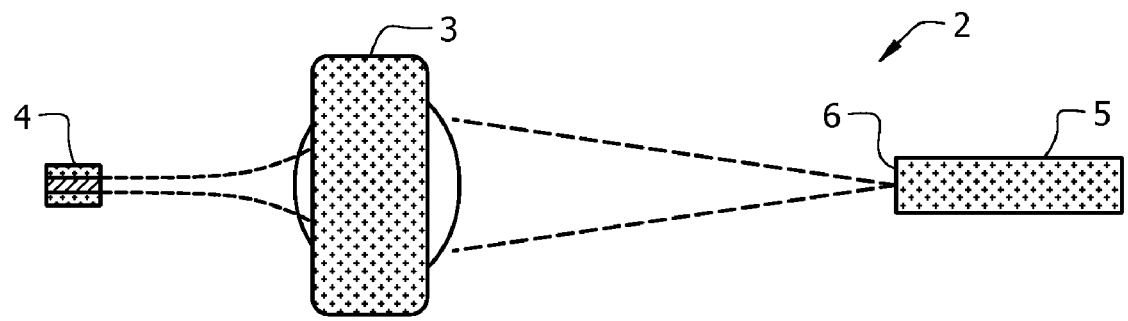
FIG. 1 illustrates a plan view of the optical components of a typical Transmitter Optical Subassembly (TOSA).
Figure 2:
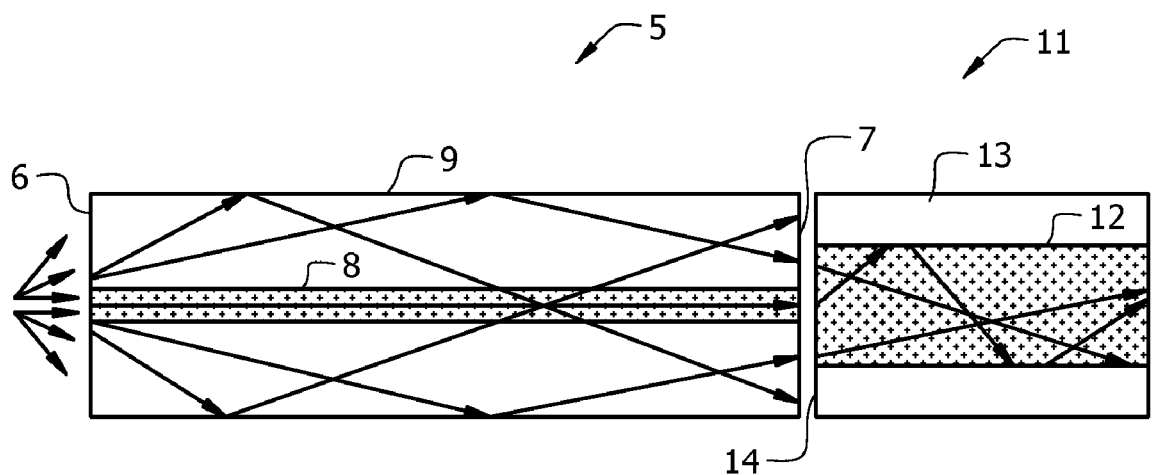
FIG. 2 illustrates a plan view of the fiber stub of the known TOSA shown in FIG. 1 having an end that is interfaced with an end of a MM fiber of a MM patch cord.

Through the absorption and filtration effects described above with reference to FIGS. 3-5, the SM fiber stub 30 attenuates most unwanted modes of light. Consequently, unlike the known TOSA shown in FIG. 1, perfect peak alignment is not needed in order to prevent or inhibit transversal misplacement and de-focalization of the light launched from the laser diode. This means that alternative lens designs to the aspheric lens and ball lens/pin hole designs may be used with the fiber stub 30. In accordance with an embodiment, a simple ball lens is used to couple light launched from the laser diode into the SM fiber, as will now be described with reference to FIG. 6.

Figure 6:
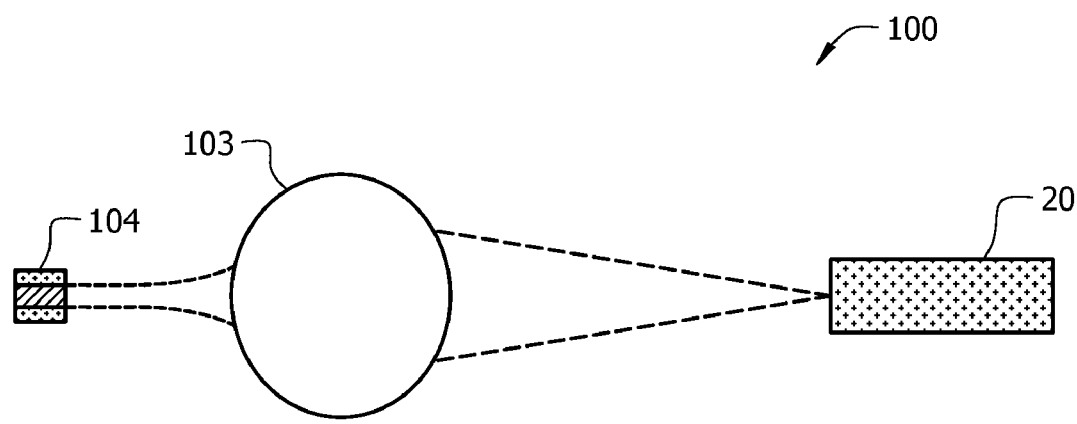
FIG. 6 illustrates a plan view of the optical components of a TOSA in accordance with an embodiment of the invention that incorporates the SM fiber stub assembly shown in FIG. 3.

FIG. 6 illustrates a plan view of the optical components of a TOSA 100 in accordance with an embodiment of the invention. In accordance with this embodiment, a ball lens 103 receives light produced by a laser diode 104 and focuses the light into the end of the SM fiber stub assembly 20 described above with reference to FIG. 5. The SM fiber stub assembly 20 performs the aforementioned absorption and filtration functions to prevent or lessen transversal misplacement and de-focalization of light coupled by the simple ball lens 103 onto the end 106 of the fiber stub assembly 20, thereby obviating the need to use more expensive lens designs.

Although some power is lost at launch due to the filtration effect of the epoxy, characterization testing of a TOSA incorporating a simple ball lens revealed that the encircled flux (EF) specification for a standard TOSA was easily met when using SM fiber having a cladding layer surrounded by the black epoxy. The EF specification describes the power encircled within a circular radius inside of the optical fiber and denotes the laser flux energy that is coupled into the fiber. The current EF specification for a standard TOSA requires that 30% of the optical power be present at a fiber radius of 5 µm and that 86% be present at a fiber radius of 11 µm. During characterization testing, it was observed that at peak alignment the EF margins are comparable to those that were previously observed during characterization testing of a TOSA having an aspherical lens with standard SM fiber without the epoxy. In addition, characterization testing was performed at less than peak alignment, e.g., ±100 µm defocus along the optical axis, which revealed that the TOSA with the ball lens used in conjunction with the SM fiber surrounded by the black epoxy had the same EF margin that was measured for the same assembly at peak alignment. For comparison purposes, characterization testing was also performed for the TOSA with the ball lens with standard SM fiber. These tests showed that the assembly was marginally compliant with the EF specification at peak alignment, but failed to meet the EF specification when misaligned by 100 µm along the optical axis.

The invention provides the following advantages: (1) a TOSA that incorporates a simple ball lens can be used with guaranteed EF specification compliance; (2) compliance is guaranteed not only for peak alignment, but also for relatively large misalignments along the optical axis; (3) batch processing can be used to manufacture the ferules, with the cladding etching process adding only a single additional step (etching) to the ferule manufacturing process. The result of these advantages is a TOSA having a manufacturing cost that is significantly reduced without suffering performance degradation.

Figure 7:
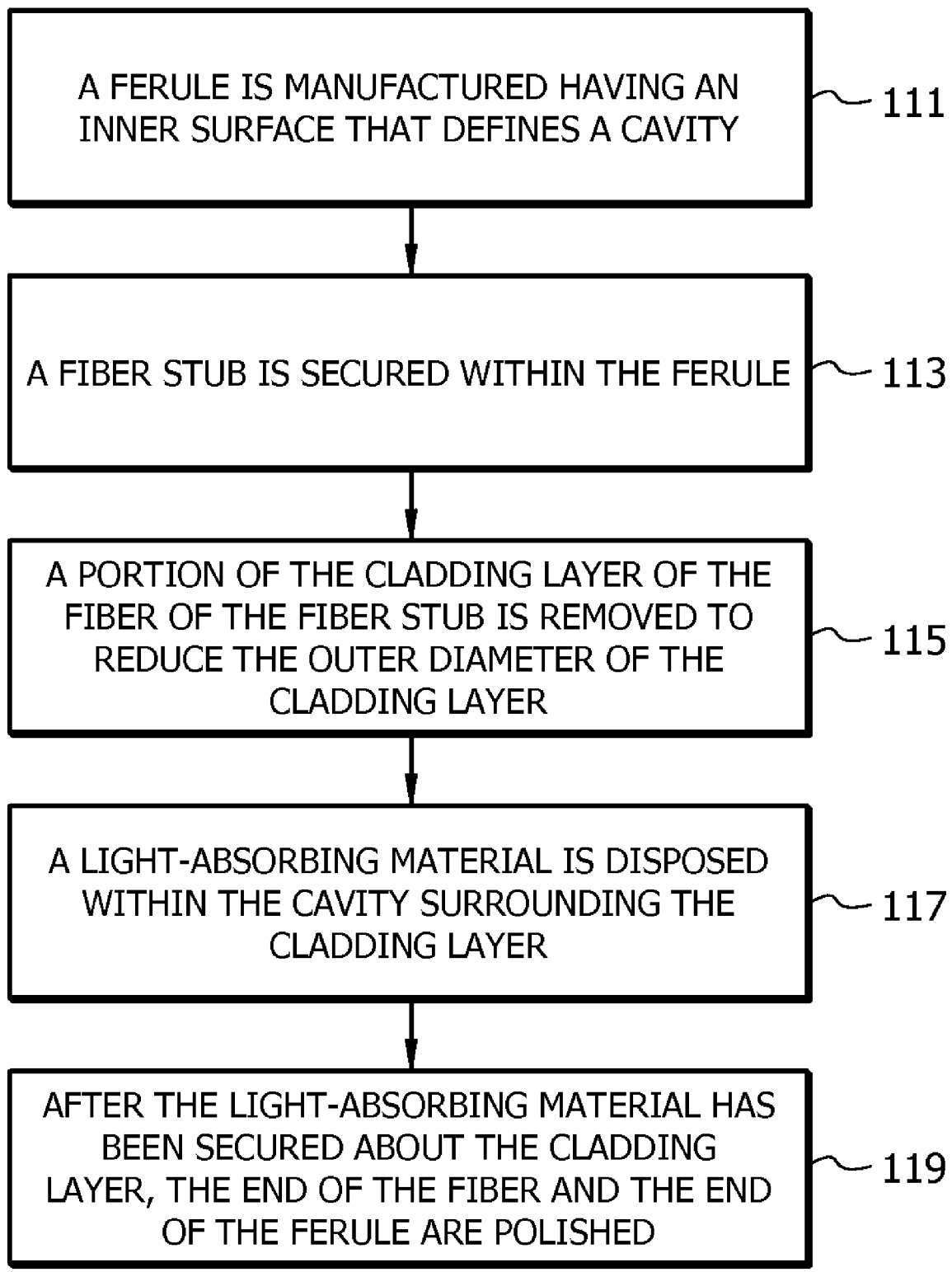
FIG. 7 illustrates a flowchart that represents a method for manufacturing an SM fiber stub assembly in accordance with an embodiment of the invention.

FIG. 7 illustrates a flowchart that represents a method for manufacturing an optical fiber stub assembly in accordance with an embodiment of the invention. As illustrated by block 111, a ferule is manufactured that has an inner surface that defines a cavity (e.g., a chamfered portion) that will surround a proximal portion of the fiber stub when the fiber stub is secured with the ferule. A fiber stub is then secured within the ferule, as indicated by block 113. A portion of the cladding layer of the fiber is then removed to reduce the outer diameter of the cladding layer, as indicated by block 115. As described above with reference to FIG. 3, reducing the outer diameter of the cladding layer preferably is accomplished via etching in a chemical solution, although other techniques may also be used. The ferule is then filled with a light-absorbing material, such as the aforementioned black epoxy. This process is represented by block 117. After the light-absorbing material has been secured about the cladding layer, e.g., by curing the epoxy, a polishing process is performed during which the end of the ferule and the end of the fiber stub are simultaneously polished, as indicated by block 119.

It should be noted that the invention has been described with reference to a few illustrative embodiments and that the invention is not limited to these embodiments. For example, although the diameter of the cladding layer of the SM fiber stub 30 has been described herein as being reduced through the use of an etching process, the diameter of the cladding layer could instead be accomplished through use of a polishing process. The polishing process, however, generally leads to higher costs due to the fact that polishing typically is performed on a unit-by-unit basis, rather than in terms of batches. In addition, although the black epoxy described above has the desirable qualities of being absorptive to the 1300 and 1550 nm wavelengths, other epoxies as well as materials other than epoxies may be used to accomplish this objective. For example, with reference to FIG. 5, the epoxy surrounding the etched portion 32 of the cladding layer 31 may be replaced with a reflective material (e.g., metal), which will also serve to reduce the size of the opening 55 through which light may be received into the fiber. In the latter case, any light from the laser diode that impinges on the reflective material rather than on the opening 55 will be reflected away from the stub 30.

Also, while the invention has been described with reference to a fiber stub having a core and a single cladding layer, it should be noted that the stub may include other layers between the core and the cladding layer. The cladding layer referred to above with respect to the figures is the outer layer of the fiber, which is typically made of silica (i.e., glass). It is this outer cladding layer that has an outer diameter that is reduced and surrounded by the light-absorbing material, regardless of the material this outer layer is made of and regardless of any additional layers that are interposed between the cladding layer and the core. These and other modifications may be made to the invention without deviating from the scope of the invention.

What is claimed is:

1. A mode selective optical fiber stub assembly comprising:

an optical fiber stub having a core and a cladding layer, the fiber stub having a proximal portion and a distal portion, the proximal portion having a proximal end corresponding to an entrance facet of the stub and the distal portion having a distal end corresponding to an exit facet of the stub, the cladding layer having an inner surface that is in contact with an outer surface of the core, the cladding layer having an inner diameter corresponding to the inner surface of the cladding layer, the cladding layer having a first outer diameter corresponding to the outer surface of the cladding layer in the proximal portion of the fiber stub, the cladding layer having a second outer diameter corresponding to the outer surface of the cladding layer in the distal portion of the stub, wherein the first outer diameter is smaller than the second outer diameter;

a ferule, the fiber stub being secured within the ferule, wherein a cavity formed in the ferule surrounds the proximal portion of the fiber stub; and a light-absorbing material disposed within the cavity formed in the ferule and surrounding at least the outer surface of the cladding layer in the proximal portion of the fiber stub, the light-absorbing material having a refractive index that is equal to, or at least substantially equal to, a refractive index of the outer surface of the cladding layer, wherein the refractive indexes of the light-absorbing material and of the outer surface of the cladding layer remain at substantially constant values that are substantially equal to each other, wherein the light-absorbing material is absorptive to light of at least one particular wavelength or wavelength range such that at least one mode of light of the particular wavelength or wavelength range that is propagating in the cladding layer propagates into the light-absorbing material and is absorbed thereby, and wherein the light-absorbing material surrounding at least the outer surface of the cladding layer in the proximal portion of the fiber stub creates a pin hole opening in the proximal end of the fiber stub, wherein light from a light source is launched into the fiber stub through the pin hole opening.

2. The mode selective optical fiber stub of claim 1, wherein the light-absorbing material is an epoxy that is absorptive to light of wavelengths ranging from approximately 1300 to approximately 1550 nanometers (nm).

3. The mode selective optical fiber stub of claim 2, wherein the optical fiber is a single mode (SM) optical fiber.

4. The mode selective optical fiber stub of claim 3, wherein the pin hole opening is approximately 20 to approximately 30 micrometers (μm) in diameter.

5. The mode selective optical fiber stub of claim 3, wherein the mode selective fiber stub assembly is part of a transmitter optical subassembly (TOSA).

6. A transmitter optical subassembly (TOSA) comprising:
    a light source for producing light;
    a mode selective optical fiber stub assembly comprising:
        an optical fiber stub having a core and a cladding layer, the fiber stub having a proximal portion and a distal portion, the proximal portion having a proximal end corresponding to an entrance facet of the stub and the distal portion having a distal end corresponding to an exit facet of the stub, the cladding layer having an inner surface that is in contact with an outer surface of the core, the cladding layer having an inner diameter corresponding to the inner surface of the cladding layer, the cladding layer having a first outer diameter corresponding to the outer surface of the cladding layer in the proximal portion of the fiber stub, the cladding layer having a second outer diameter corresponding to the outer surface of the cladding layer in the distal portion of the stub, wherein the first outer diameter is smaller than the second outer diameter;
        a ferule, the fiber stub being secured within the ferule, wherein a cavity formed in the ferule surrounds the proximal portion of the fiber stub; and
        a light-absorbing material disposed within the cavity formed in the ferule and surrounding at least the outer surface of the cladding layer in the proximal portion of the fiber stub, the light-absorbing material having a refractive index that is equal to, or at least substantially equal to, a refractive index of the outer surface of the cladding layer, wherein the refractive indexes of the light-absorbing material and of the outer surface of the cladding layer remain at substantially constant values that are substantially equal to each other, wherein the light-absorbing material is absorptive to light of at least one particular wavelength or wavelength range such that at least one mode of light of the particular wavelength or wavelength range that is propagating in the cladding layer propagates into the light-absorbing material and is absorbed thereby, and wherein the light-absorbing material surrounding at least the outer surface of the cladding layer in the proximal portion of the fiber stub creates a pin hole opening in the proximal end of the fiber stub, wherein light from a light source is launched into the fiber stub through the pin hole opening; and
    a ball lens that receives light produced by the light source and couples the received light into the proximal end of the fiber stub.

7. The TOSA of claim 6, wherein the light-absorbing material is an epoxy that is absorptive to light of wavelengths ranging from approximately 1300 to approximately 1550 nanometers (nm).

8. The TOSA of claim 7, wherein the optical fiber is a single mode (SM) optical fiber.

9. The TOSA of claim 7, wherein the pin hole opening is approximately 20 to approximately 30 micrometers (μm) in diameter.

10. A method for making a mode selective optical fiber stub assembly, the method comprising:
    manufacturing a ferule with an inner surface that is adapted to receive and optical fiber stub therein and to provide a cavity that will surround a proximal portion of an optical fiber stub when the optical fiber stub is secured within the ferule;
    securing an optical fiber stub within the ferule;
    removing a portion of a cladding layer of the fiber stub in a proximal portion of the fiber stub to reduce an outer diameter of the cladding layer in the proximal portion of the fiber stub, wherein the proximal portion has a proximal end corresponding to an entrance facet of the fiber stub;
    disposing a light-absorbing material in the cavity formed in the ferule such that the light-absorbing material surrounds the cladding layer in the proximal portion of the fiber stub, the light-absorbing material surrounding at least the outer surface of the cladding layer in the proximal portion of the fiber stub, the light-absorbing material having a refractive index that is equal to, or at least substantially equal to, a refractive index of the outer surface of the cladding layer, wherein the refractive indexes of the light-absorbing material and of the outer surface of the cladding layer remain at substantially constant values that are substantially equal to each other, wherein the light-absorbing material is absorptive to light of at least one particular wavelength or wavelength range such that at least one mode of light of the particular wavelength or wavelength range that is propagating in the cladding layer propagates into the light-absorbing material and is absorbed thereby, and wherein the light-absorbing material surrounding at least the outer surface of the cladding layer in the proximal portion of the fiber stub creates a pin hole opening in the proximal end of the fiber stub, wherein light from a light source is launched into the fiber stub through the pin hole opening; and
    after the light-absorbing material is secured about the cladding layer in the proximal portion of the fiber stub, polishing a proximal end of the proximal portion of the fiber stub.

11. The method of claim 10, wherein the light-absorbing material is an epoxy that is absorptive to light of wavelengths ranging from approximately 1300 to approximately 1550 nanometers (nm).

12. The method of claim 11, wherein the optical fiber is a single mode (SM) optical fiber.

13. The method of claim 12, wherein the pin hole opening is approximately 20 to approximately 30 micrometers (μm) in diameter.

14. The method of claim 12, wherein the mode selective fiber stub assembly is part of a transmitter optical subassembly (TOSA).

15. The method of claim 10, wherein the portion of the cladding is removed by performing a chemical etching process that chemically etches the proximal portion of the fiber stub.

16. The method of claim 15, wherein the method is performed as a batch process to simultaneously manufacture multiple fiber stub assemblies, and wherein the etching process is performed simultaneously on a batch of the optical fiber stub assemblies after the respective fiber stubs have been secured to the respective ferule assemblies and before the light-absorbing material has been disposed in the cavity.

* * * * *